(12) United States Patent
Mao

(10) Patent No.: US 10,764,586 B2
(45) Date of Patent: Sep. 1, 2020

(54) BIT RATE ALLOCATION METHOD, APPARATUS, AND STORAGE MEDIUM FOR CODE UNITS IN VIDEO CODING

(71) Applicant: TENCENT TECHNOLOGY (SHENZHEN) COMPANY LIMITED, Shenzhen, Guangdong (CN)

(72) Inventor: Xu Nan Mao, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 0 days.

(21) Appl. No.: 16/391,448

(22) Filed: Apr. 23, 2019

(65) Prior Publication Data
US 2019/0253717 A1      Aug. 15, 2019

Related U.S. Application Data

(63) Continuation of application No. PCT/CN2018/077781, filed on Mar. 1, 2018.

(30) Foreign Application Priority Data

Mar. 7, 2017    (CN) .......................... 2017 1 0132204

(51) Int. Cl.
*H04N 19/149* (2014.01)
*H04N 19/105* (2014.01)
(Continued)

(52) U.S. Cl.
CPC ......... *H04N 19/149* (2014.11); *H04N 19/105* (2014.11); *H04N 19/11* (2014.11);
(Continued)

(58) Field of Classification Search
CPC ..... H04N 19/149; H04N 19/105; H04N 19/11
(Continued)

(56) References Cited

U.S. PATENT DOCUMENTS 6,002,802 A * 12/1999 Chujoh ................ H04N 19/176
375/E7.027
2002/0168007 A1    11/2002 Lee
(Continued)

FOREIGN PATENT DOCUMENTS

| CN | 101127909 A | 2/2008 |
| CN | 101883283 A | 11/2010 |

(Continued)

OTHER PUBLICATIONS

Chinese Office Action issued in CN 201710132204.4 dated Feb. 27, 2018.
(Continued)

*Primary Examiner* — Hee-Yong Kim
(74) *Attorney, Agent, or Firm* — Sughrue Mion, PLLC

(57) ABSTRACT

A bit rate allocation method for video coding and a bit rate allocation method for code units are applied to a client or a server. The method includes: obtaining a target bit rate and a coded bit rate of a current frame; determining a frame uncoded bit rate based on the target bit rate and the coded bit rate; obtaining current code unit prediction costs and frame uncoded unit prediction costs that are determined based on precoding; and determining a target bit rate of a current to-be-coded code unit based on the frame uncoded bit rate and a cost ratio, the cost ratio being a ratio of the current code unit prediction costs to the frame uncoded unit prediction costs.

20 Claims, 7 Drawing Sheets

(51) Int. Cl.
  *H04N 19/11* (2014.01)
  *H04N 19/159* (2014.01)
  *H04N 19/146* (2014.01)
  *H04N 19/172* (2014.01)
  *H04N 19/147* (2014.01)

(52) U.S. Cl.
  CPC ......... *H04N 19/146* (2014.11); *H04N 19/147* (2014.11); *H04N 19/159* (2014.11); *H04N 19/172* (2014.11)

(58) Field of Classification Search
  USPC ...................................... 375/240.23
  See application file for complete search history.

(56) References Cited

U.S. PATENT DOCUMENTS

| | | | | |
|---|---|---|---|---|
| 2007/0147512 | A1* | 6/2007 | Eckart | H04N 19/115 375/240.24 |
| 2010/0118937 | A1 | 5/2010 | Shimizu et al. | |
| 2011/0249728 | A1 | 10/2011 | Bock et al. | |

FOREIGN PATENT DOCUMENTS

| | | |
|---|---|---|
| CN | 102647586 A | 8/2012 |
| CN | 102868883 A | 1/2013 |
| CN | 106385627 A | 2/2017 |
| CN | 106961604 A | 7/2017 |
| JP | 2007300455 A | 11/2007 |
| JP | 2013128189 A | 6/2013 |
| JP | 2015-181225 A | 10/2015 |
| JP | 2017005503 A | 1/2017 |
| WO | 2008111458 A1 | 9/2008 |
| WO | 2014168877 A1 | 10/2014 |

OTHER PUBLICATIONS

Written Opinion of the International Searching Authority of PCT/CN2018/077781 dated May 18, 2018.
International Search Report of PCT/CN2018/077781 dated May 18, 2018.
Office Action Summary dated Mar. 30, 2020 from the Japanese Patent Office in application No. 2019-524462.
Written Opinion from the International Bureau in application No. PCT/CN2018/077781 dated May 18, 2018.

* cited by examiner

BIT RATE ALLOCATION METHOD, APPARATUS, AND STORAGE MEDIUM FOR CODE UNITS IN VIDEO CODING

CROSS-REFERENCE TO RELATED APPLICATION(S)

This application is a continuation of International Application No. PCT/CN2018/077781, filed on Mar. 1, 2018, in the Chinese Patent Office, which claims priority to Chinese Patent Application No. 201710132204.4, entitled "bit rate allocation method and apparatus for video coding, bit rate allocation method and apparatus for code units", and filed on Mar. 7, 2017, the disclosures of which are incorporated in their entireties by reference.

BACKGROUND

Exemplary embodiments relate to the field of video coding technologies, and in particular, to a bit rate allocation method for video coding, a bit rate allocation method for code units, a computer device, and a storage medium.

1. Field

As network-related technologies become increasingly developed, video services such as video chat and online video viewing have been widely applied. The video services cannot be widely applied without the support of video coding technologies.

In a video coding technology, a bit rate needs to be allocated to a code unit in each frame. In a conventional bit rate allocation algorithm in video coding (compression), first, prediction costs of all uncoded code units in a current frame are predicted; then, a target bit rate is allocated to a current to-be-coded code unit with reference to costs of a coded code unit in the current frame; and subsequently, a quantization parameter of the current to-be-coded code unit is set based on the target bit rate of the current to-be-coded code unit.

2. Description of the Related Art

Because when the current to-be-coded code unit is not coded, accurate prediction costs cannot be obtained. If video image content suddenly changes, code units corresponding to a current frame and a previous frame have poor cost similarities and low prediction accuracy, and in an extreme case, prediction costs may even be less than 0. In this case, bit rate allocation of the current to-be-coded code unit may have an extremely large error, finally, resulting in poor video quality.

SUMMARY

One or more exemplary embodiments provide a bit rate allocation method for video coding, a bit rate allocation method for code units, a computer device, and a storage medium, to improve the video quality.

A bit rate allocation method for code units in video coding is applied to a user terminal or a server, and includes:

obtaining a target bit rate and a coded bit rate of a current frame, the coded bit rate being determined based on an actual bit rate of each coded code unit in the current frame;

determining a frame uncoded bit rate based on the target bit rate and the coded bit rate;

obtaining current code unit prediction costs and frame uncoded unit prediction costs that are determined based on precoding, the current code unit prediction costs being unit prediction costs of a current to-be-coded code unit among uncoded code units in the current frame, and the frame uncoded unit prediction costs being determined based on unit prediction costs of the uncoded code units in the current frame; and determining a target bit rate of the current to-be-coded code unit based on the frame uncoded bit rate and a cost ratio, the cost ratio being a ratio of the current code unit prediction costs to the frame uncoded unit prediction costs.

A computer device includes a memory and a processor, the memory storing computer-readable instructions, and when executed by the processor, the computer-readable instructions causing the processor to perform the following operations:

obtaining a target bit rate and a coded bit rate of a current frame, the coded bit rate being determined based on an actual bit rate of each coded code unit in the current frame;

determining a frame uncoded bit rate based on the target bit rate and the coded bit rate of the current frame;

obtaining current code unit prediction costs and frame uncoded unit prediction costs that are determined based on precoding, the current code unit prediction costs being unit prediction costs of a current to-be-coded code unit among uncoded code units in the current frame, and the frame uncoded unit prediction costs being determined based on unit prediction costs of the uncoded code units in the current frame; and determining a target bit rate of the current to-be-coded code unit based on the frame uncoded bit rate and a cost ratio, the cost ratio being a ratio of the current code unit prediction costs to the frame uncoded unit prediction costs.

According to the bit rate allocation method for code units in video coding and the computer device, because the current code unit prediction costs and the frame uncoded unit prediction costs that are determined on precoding are obtained, the obtained current code unit prediction costs and frame uncoded unit prediction costs are closer to actual costs. Therefore, the target bit rate of the current to-be-coded code unit is determined by using the frame uncoded bit rate and the ratio of the current code unit prediction costs to the frame uncoded unit prediction costs that are closer to the actual costs, and therefore, the target bit rate is more accurate, thereby reducing an error of bit rate allocation of the current to-be-coded code unit, and improving video quality.

A bit rate allocation method for video coding is applied to a user terminal or a server, and includes:

obtaining a frame type of a current frame and a frame type of a previous frame; and when the frame type of the current frame is different from the frame type of the previous frame, allocating a bit rate to each code unit in the current frame by using the foregoing bit rate allocation method for code units in video coding.

A computer device includes a memory and a processor, the memory storing computer-readable instructions, and when executed by the processor, the computer-readable instructions causing the processor to perform the following operations:

obtaining a frame type of a current frame and a frame type of a previous frame; and when the frame type of the current frame is different from the frame type of the previous frame, allocating a bit rate to each code unit in the current frame by using the foregoing bit rate allocation method for code units in video coding according to any one of the above described methods.

According to the allocation method for video coding and the computer device, when a frame type of a current frame is different from a frame type of a previous frame, the bit rate allocation method for code units in video coding that can reduce an error of bit rate allocation of a current to-be-coded code unit and improve video quality is used to allocate a bit rate to each code unit in the current frame, thereby improving the video quality.

Details of one or more embodiments of this application are provided in the following accompanying drawings and descriptions. Other features, objectives, and advantages of this application become clearer from the specification, the accompanying drawings, and the claims.

BRIEF DESCRIPTION OF THE DRAWINGS

These and/or other aspects will become apparent and more readily appreciated from the following description of the embodiments, taken in conjunction with the accompanying drawing.

DETAILED DESCRIPTION

To make the objectives, technical solutions, and advantages of the disclosure more comprehensible, the disclosure is further described in detail below with reference to the accompanying drawings and embodiments. It should be understood that specific implementations described herein are merely used to explain the disclosure, and are not intended to limit the protection scope of the disclosure.

In subsequent descriptions, suffixes such as "module", "component", or "unit" that are used to represent elements are merely conducive to the descriptions of the embodiments, and have no specific meanings themselves. It will be understood that, the terms, such as "unit," "module," "component," "part," etc., should be understood as a unit that performs at least one function or operation and that may be embodied as hardware, software, or a combination thereof.

A plurality of details is described in the following detailed descriptions for thorough understanding of the disclosure. However, for persons of ordinary skill in the art, the disclosure may obviously be implemented without these details. In other cases, a disclosed well-known method, process, assembly, circuit, and network are not described in detail, to not to unnecessarily obscure the aspects of the embodiments.

In addition, in this specification, although elements (or thresholds or applications or instructions or operations) are described by using terms such as "first" and "second" for a plurality of times, the elements should not be limited by these terms. These terms are merely used to distinguish between an element and another element. For example, a first operation may be referred to as a second operation, and the second operation may also be referred to as the first operation.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
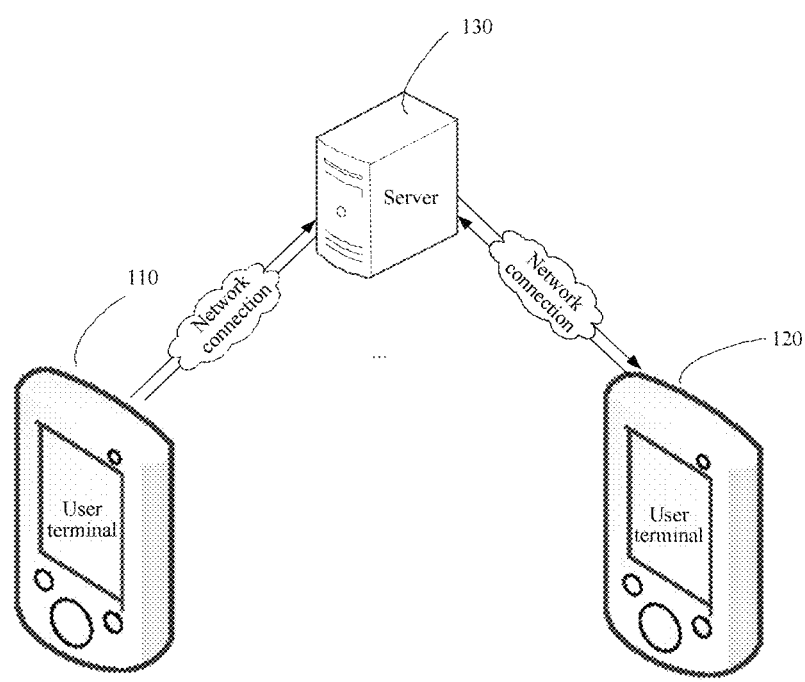
FIG. 1 is a schematic diagram of an application environment of a bit rate allocation method and apparatus for video coding and a bit rate allocation method and apparatus for code units according to an embodiment.

FIG. 1 is a schematic diagram of an application environment of a bit rate allocation method for video coding and a bit rate allocation method for code units for improving video quality according to an embodiment.

As shown in FIG. 1, the application environment includes a first user terminal 110, a second user terminal 120, and a server 130. The first user terminal 110 and the second user terminal 120 each have a network connection to the server 130. The first user terminal 110 and the second user terminal 120 each run an application program of video communication. A first user collects video data by using the first user terminal 110. The video data is sent to the second user terminal 120 by using the server 130. A second user views the video data by using the second user terminal 120. Similarly, the first user views, by using the first user terminal 110, video information collected by the second user terminal 120, thereby implementing video communication between the first user and the second user. In an exemplary embodiment, the bit rate allocation method for video coding and the bit rate allocation method for code units are run in the first user terminal 110 or the second user terminal 120.

In another application scenario, alternatively, the application environment may only include the first user terminal 110 and the server 130, and the first user terminal 110 has a network connection to the server 130. The first user terminal 110 sends collected video data to the server 130. The bit rate allocation method for video coding and the bit rate allocation method for code units are run in the first user terminal 110.

In another embodiment, the first user may further send a streaming media file to the second user terminal by using the first user terminal 110. In an exemplary embodiment, the bit rate allocation method for video coding and the bit rate allocation method for code units are run in the server 130. After decoding a video stream sent by the first user terminal 110, the server 130 recodes the video stream, and sends the recoded video stream to the second user terminal 120, to meet play requirements of different terminal platforms.

In another application scenario, alternatively, the application environment may only include the first user terminal 110 and the server 130, and the first user terminal 110 has a network connection to the server 130. The first user terminal 110 sends a streaming media file to the server 130. The bit rate allocation method for video coding and the bit rate allocation method for code units are run in the server 130.

Figure 2:
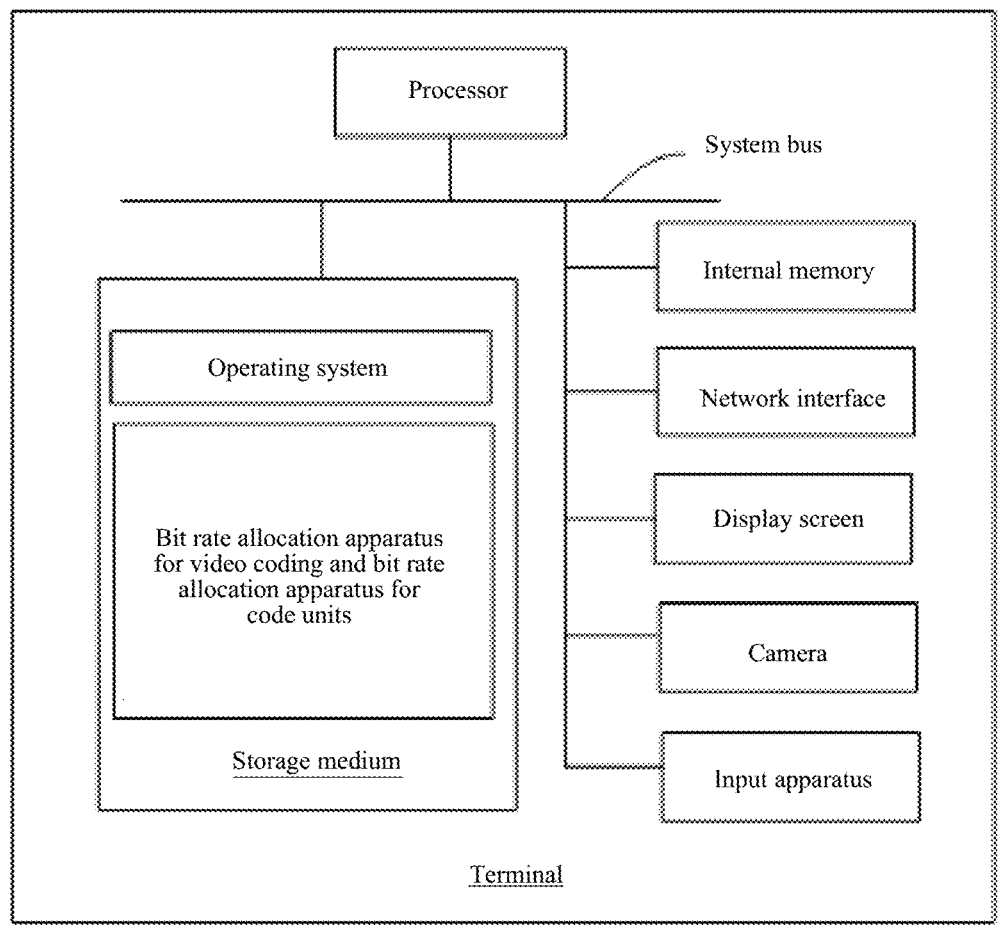
FIG. 2 is a schematic diagram of an internal structure of a user terminal in FIG. 1.

FIG. 2 is a schematic diagram of an internal structure of a user terminal according to an embodiment. As shown in FIG. 2, the user terminal includes a processor, a storage medium, an internal memory, a network interface, a display screen, a camera, and an input apparatus that are connected by using a system bus.

The storage medium of the terminal stores an operating system, a bit rate allocation apparatus for video coding, and a bit rate allocation apparatus for code units. The bit rate allocation apparatus for video coding and the bit rate allocation apparatus for code units are configured to implement a bit rate allocation method for video coding and a bit rate allocation method for code units. The processor is configured to provide a computing capability and a control capability, to support operation of the entire user terminal.

An internal memory of the user terminal provides an environment for the bit rate allocation apparatus for video coding and the bit rate allocation apparatus for code units in the storage medium. The internal memory may store computer-readable instructions. When executed by the processor, the computer-readable instructions cause the processor to perform a bit rate allocation method for video coding and a bit rate allocation method for code units. A network interface of the user terminal is configured to perform network communication with a server, for example, send a video file to the server, or receive a video file from another user terminal sent by the server. A display screen of the user terminal may be a liquid crystal display screen, an electronic ink display screen, or the like. The input apparatus may be a touch layer covering the display screen, may be a key, a trackball, or a touchpad disposed on a user terminal housing, or may be an extraneous keyboard, touchpad, mouse, or the like. The user terminal may be a mobile phone, a tablet computer, a personal digital assistant, a wearable device, or the like. A person skilled in the art may understand that the structure shown in FIG. 2 is only a block diagram of a part of structure related to the solution of the disclosure, and does not constitute any limitation to a user terminal to which the solution of the disclosure is applied. A specific user terminal may include more or less components than those shown in the figure, or some components are combined, or a different component deployment is used.

Figure 3:
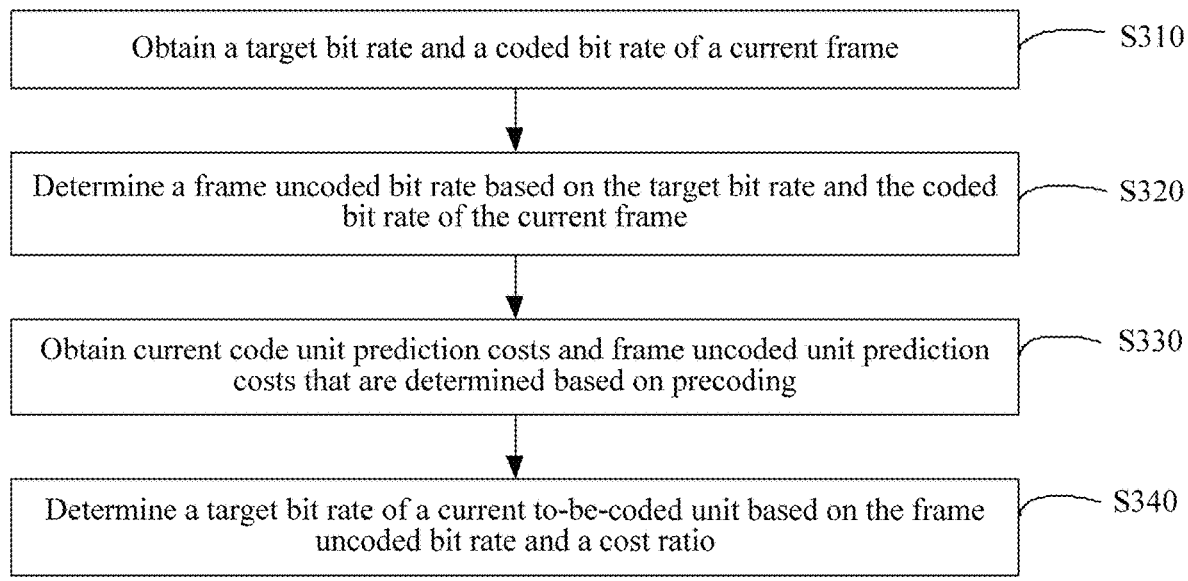
FIG. 3 is a flowchart of a bit rate allocation method for code units in video coding according to an embodiment.

Referring to FIG. 3, in an embodiment, a bit rate allocation method for code units in video coding is provided. The method is run in the user terminals or the server 130 shown in FIG. 1. The method may include operations S310-S340:

S310: Obtain a target bit rate and a coded bit rate of a current frame. The coded bit rate is determined based on an actual bit rate of each coded code unit in the current frame.

The current frame is a frame that has not been coded yet and that is currently to be coded. The target bit rate is a to-be-allocated bit rate. The coded bit rate is a bit rate that has been coded. The target bit rate of the current frame may be determined based on a target bit rate in a video and a coded bit rate in the video.

S320: Determine a frame uncoded bit rate based on the target bit rate and the coded bit rate of the current frame.

An uncoded bit rate, that is, the frame uncoded bit rate, of the current frame may be obtained by subtracting the coded bit rate of the current frame from the target bit rate of the current frame.

S330: Obtain current code unit prediction costs and frame uncoded unit prediction costs that are determined based on precoding.

The current frame is precoded. The current code unit prediction costs and the frame uncoded bit prediction costs are determined based on the precoding. That is, the current code unit prediction costs and the frame uncoded unit prediction costs that are determined based on the precoding are obtained. In this manner, the obtained current code unit prediction costs and frame uncoded unit prediction costs are closer to actual costs.

The current code unit prediction costs are unit prediction costs of a current to-be-coded code unit among uncoded code units in the current frame. The frame uncoded unit prediction costs may be determined based on unit prediction costs of the uncoded code units in the current frame.

S340: Determine a target bit rate of the current to-be-coded code unit based on the frame uncoded bit rate and a cost ratio. The cost ratio is a ratio of the current code unit prediction costs to the frame uncoded unit prediction costs.

The target bit rate of the current to-be-coded code unit may be determined based on the frame uncoded bit rate and the cost ratio. For example, the target bit rate of the current to-be-coded code unit may be a product of the frame uncoded bit rate and the cost ratio; or the target bit rate of the current to-be-coded code unit may be a product of the frame uncoded bit rate and the cost ratio multiplying a weight coefficient.

For ease of understanding, an example scenario is assumed in which the current frame has n code units in total, the current to-be-coded code unit is an $i^{th}$ code unit in the current frame, the first code unit to an $(i-1)^{th}$ code unit in the current frame have been coded, and the $i^{th}$ code unit to the $n^{th}$ code unit have not been coded, and a target bit rate of all uncoded code units, that is, the frame uncoded bit rate, is recorded as $T\arg et\_BU_{i\_n}$. A ratio of the prediction costs of the current to-be-coded code unit to the frame uncoded unit prediction costs is recorded as $C_i$:

$$C_i = \frac{\text{Cost}_i}{\sum_{j=i}^{n} \text{Cost}_j}$$

The target bit rate of the current to-be-coded code unit, that is, a bit rate of the current to-be-coded code unit, is recorded as $T\arg et\_BU_i$: $T\arg et\_BU_i = T\arg et\_BU_{i\_n} * C_i$.

According to the bit rate allocation method for code units in video coding, because the current code unit prediction costs and the frame uncoded unit prediction costs that are determined on precoding are obtained, the obtained current code unit prediction costs and frame uncoded unit prediction costs are closer to actual costs. Therefore, the target bit rate of the current to-be-coded code unit is determined by using the frame uncoded bit rate and the ratio of the current code unit prediction costs to the frame uncoded unit prediction costs that are closer to the actual costs, and therefore, the target bit rate is more accurate, thereby reducing an error of bit rate allocation of the current to-be-coded code unit, and improving video quality.

In an embodiment, after operation S340, the bit rate allocation method for code units in video coding further includes:

determining a quantization parameter of the current to-be-coded code unit based on the target bit rate of the current to-be-coded code unit. In this manner, an actual bit rate of a current code unit is as close to a target bit rate of the current code unit as possible.

Figure 4:
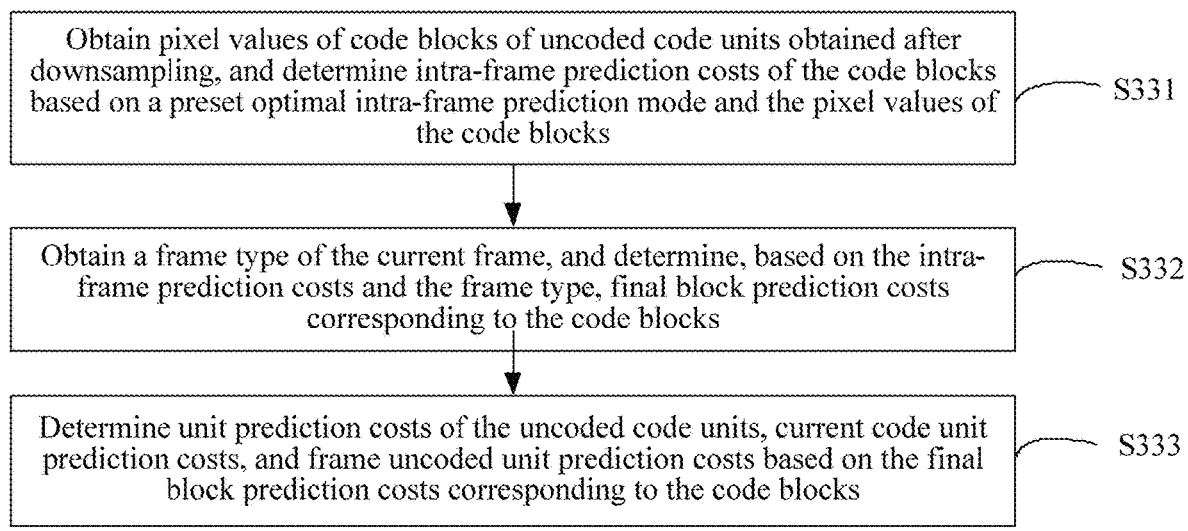
FIG. 4 is a specific flowchart of operations of the bit rate allocation method for code units in video coding in FIG. 3.

Referring to FIG. 4, in an embodiment, the operation of obtaining current code unit prediction costs and frame uncoded unit prediction costs that are determined based on precoding includes the following operations, that is, operation S330 includes the following operations:

S331: Obtain pixel values of code blocks of the uncoded code units obtained after downsampling, and determine intra-frame prediction costs of the code blocks based on a preset optimal intra-frame prediction mode and the pixel values of the code blocks.

In an exemplary embodiment, the current frame is precoded through downsampling. Specifically, 2:1 downsampling may be performed on the current frame. That is, if a length and a width of an original image are respectively a and b, a length and a width of a downsampled image are respectively a/2 and b/2. If the length and the width after downsampling are not integral multiples of N, side extension is performed on the downsampled image, so that the length and the width become integral multiples of N. N×N is a smallest code block in precoding, may be 4×4, 8×8, 16×16, and the like, and satisfies the condition that a downsampled image corresponding to one code unit includes an integral quantity of N×N code blocks. It should be understood that a downsampling ratio is not limited to 2:1, and may alternatively be 3:1, 4:1, or the like.

The preset optimal intra-frame prediction mode may be preset, or may be determined by using a preset policy.

The manner for determining intra-frame prediction costs of the code blocks based on a preset optimal intra-frame prediction mode and the pixel values of the code blocks may be: subtracting a prediction value determined by using the preset optimal intra-frame prediction mode from a pixel value of each pixel of the code blocks, to obtain a prediction residual; and adding absolute values of prediction residuals of all pixels, to obtain a sum of the absolute values, and using the sum as the intra-frame prediction costs of the code blocks, or using a quadratic sum of prediction residuals of all pixels of the code blocks as the intra-frame prediction costs of the code blocks; or transforming each prediction residual, and using a sum of absolute values of coefficients obtained after transformation as the intra-frame prediction costs of the code blocks.

S332: Obtain a frame type of the current frame, and determine, based on the intra-frame prediction costs and the frame type, final block prediction costs corresponding to the code blocks.

The frame type includes an intra-frame prediction frame (a frame I) and an inter-frame prediction frame (a frame P). For the intra-frame prediction frame, final prediction costs need to be determined by using intra-frame prediction costs. For the inter-frame prediction frame, final prediction costs may be determined by using intra-frame prediction costs or inter-frame prediction costs.

S333: Determine unit prediction costs of the uncoded code units, the current code unit prediction costs, and the frame uncoded unit prediction costs based on the final block prediction costs corresponding to the code blocks.

The unit prediction costs of the uncoded code units may be determined based on the final block prediction costs corresponding to the code blocks of the uncoded code units. For example, a sum of the final block prediction costs corresponding to the code blocks may be used as the unit prediction costs of the code unit; or a result obtained by multiplying the final block prediction costs corresponding to the code blocks and a weight and then by performing summation may be used as the unit prediction costs of the code unit; or a product of a sum of the final block prediction costs corresponding to the code blocks and a weight coefficient may be used as the unit prediction costs of the code unit. In this manner, the current code unit prediction costs and the frame uncoded unit prediction costs may further be determined based on the final block prediction costs corresponding to the code blocks of the uncoded code units.

In an embodiment, the operation of obtaining pixel values of code blocks of the uncoded code units obtained after downsampling, and determining intra-frame prediction costs of the code blocks based on a preset optimal intra-frame prediction mode and the pixel values of the code blocks, that is, operation S331, includes the following operations:

(a) Select, by using a preset intra-frame selection policy, an intra-frame prediction mode for the code blocks of the uncoded code units obtained after downsampling in the current frame, to determine the optimal intra-frame prediction mode.

The preset intra-frame selection policy may be selecting a mode with a relatively small prediction residual based on values of prediction residuals; or may be transforming prediction residuals, and selecting a mode with a relatively small prediction residual obtained after transformation. The intra-frame prediction mode is related to a selected coding standard. For example, the High Efficiency Video Coding (HEVC) standard has 33 types of angle prediction modes, 1 planar mode, and 1 direct current (DC) mode.

(b) Obtain the pixel values of the code blocks, and determine intra-frame prediction values of the code blocks based on the optimal intra-frame prediction mode corresponding to the code blocks.

The pixel values of the code blocks of the uncoded code units obtained after downsampling in the current frame are obtained. In addition, prediction values of the code blocks, that is, the intra-frame prediction values of the code blocks are determined based on the optimal intra-frame prediction mode corresponding to the code blocks.

(c) Determine intra-frame block prediction costs based on the pixel values and the intra-frame prediction values of the code blocks, the intra-frame block prediction costs being the intra-frame prediction costs of the code blocks.

The intra-frame block prediction costs may be determined based on a difference between the pixel values and the intra-frame prediction values of the code blocks. For example, an intra-frame prediction value may be subtracted from a pixel value of each pixel of the code blocks, to obtain a prediction residual; then, absolute values of prediction residuals of all pixels are added, to obtain a sum of the absolute values, and the sum is used as the intra-frame prediction costs of the code blocks; or a quadratic sum of prediction residuals of all pixels of the code blocks may be used as the intra-frame prediction costs of the code block; or each prediction residual is transformed, and a sum of absolute values of coefficients obtained after transformation is used as the intra-frame prediction costs of the code blocks.

In an embodiment, the operation of obtaining a frame type of the current frame, and determining, based on the intra-frame prediction costs and the frame type, final block prediction costs corresponding to the code blocks, that is, operation S332, includes the following operations:

(I) Obtain the frame type of the current frame.

(II) If the frame type is an intra-frame prediction frame, use the intra-frame block prediction costs as the final block prediction costs corresponding to the code blocks.

When the frame type is an intra-frame prediction frame, the intra-frame block prediction costs are used as the final block prediction costs corresponding to the code blocks. In this manner, the final block prediction costs corresponding to the code blocks of the uncoded code units in a frame whose frame type is an intra-frame prediction frame are determined.

Further, the operation of obtaining a frame type of the current frame, and determining, based on the intra-frame prediction costs and the frame type, final block prediction costs corresponding to the code blocks, that is, operation S332, further includes the following operations:

(III) If the frame type is an inter-frame prediction frame, determine inter-frame prediction costs of the code blocks based on a preset optimal inter-frame prediction mode and the pixel values of the code blocks.

(IV) Determine a smaller value between the inter-frame prediction costs and the intra-frame prediction costs of the code blocks as the final block prediction costs of the code blocks.

When the frame type is an inter-frame prediction frame, the smaller value between the inter-frame prediction costs and the intra-frame prediction costs of the code blocks is determined as the final block prediction costs of the code blocks. In this manner, the final block prediction costs corresponding to the code blocks of the uncoded code units in a frame whose frame type is an inter-frame prediction frame are determined.

It should be noted that the preset optimal inter-frame prediction mode is similar to the preset optimal intra-frame prediction mode. The preset optimal inter-frame prediction mode may be preset, or may be determined by using a preset inter-frame policy. The preset inter-frame selection policy may be selecting a mode with a relatively small prediction residual based on values of prediction residuals; or may be transforming prediction residuals, and selecting a mode with a relatively small prediction residual obtained after transformation. The inter-frame prediction mode is related to a selected coding standard. For example, the HEVC standard may use a skip mode, a merge mode, or an inter mode.

In an embodiment, the operation of determining unit prediction costs of the uncoded code units, the current code unit prediction costs, and the frame uncoded unit prediction costs based on the final block prediction costs corresponding to the code blocks, that is, operation S333, includes:

determining the unit prediction costs of the uncoded code units based on the final block prediction costs corresponding to the code blocks; and using the unit prediction costs of the current to-be-coded code unit as the current code unit prediction costs, and determining the frame uncoded unit prediction costs based on the unit prediction costs of the uncoded code units in the current frame.

In this manner, the current code unit prediction costs and the frame uncoded unit prediction costs are determined. Specifically, the frame uncoded unit prediction costs may be a sum of the unit prediction costs of the uncoded code units in the current frame; the frame uncoded unit prediction costs may be a sum of the unit prediction costs of the uncoded code units in the current frame multiplied by a weight coefficient; or the frame uncoded unit prediction costs may be a result obtained by multiplying the unit prediction costs of the uncoded code units in the current frame and a weight and then by performing summation.

For ease of management, in an embodiment, code units may be basic bit rate control units, that is, basic units (BU). The basic bit rate control units are minimum bit rate control units having consistent quantization parameters.

Figure 5:
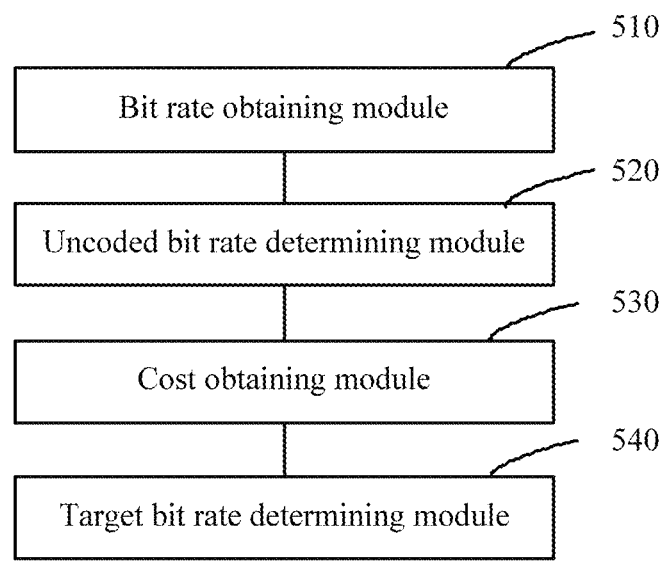
FIG. 5 is a structural block diagram of a bit rate allocation apparatus for code units in video coding according to an embodiment.

The disclosure further provides a bit rate allocation apparatus for code units in video coding in an embodiment. The apparatus is disposed in a computer device. Various modules in the apparatus may be run by the computer device. Referring to FIG. 5, a bit rate allocation apparatus for code units in video coding in an embodiment includes:

a bit rate obtaining module 510, configured to obtain a target bit rate and a coded bit rate of a current frame, the coded bit rate being determined based on an actual bit rate of each coded code unit in the current frame;

an uncoded bit rate determining module 520, configured to determine a frame uncoded bit rate based on the target bit rate and the coded bit rate of the current frame;

a cost obtaining module 530, configured to obtain current code unit prediction costs and frame uncoded unit prediction costs that are determined based on precoding, the current code unit prediction costs being unit prediction costs of a current to-be-coded code unit among uncoded code units in the current frame, and the frame uncoded unit prediction costs being determined based on unit prediction costs of the uncoded code units in the current frame; and a target bit rate determining module 540, configured to determine a target bit rate of the current to-be-coded code unit based on the frame uncoded bit rate and a cost ratio, the cost ratio being a ratio of the current code unit prediction costs to the frame uncoded unit prediction costs.

According to the bit rate allocation apparatus for code units in video coding, because the current code unit prediction costs and the frame uncoded unit prediction costs that are determined on precoding are obtained, the obtained current code unit prediction costs and frame uncoded unit prediction costs are closer to actual costs. Therefore, the target bit rate of the current to-be-coded code unit is determined by using the frame uncoded bit rate and the ratio of the current code unit prediction costs to the frame uncoded unit prediction costs that are closer to the actual costs, and therefore, the target bit rate is more accurate, thereby reducing an error of bit rate allocation of the current to-be-coded code unit, and improving video quality.

Figure 6:
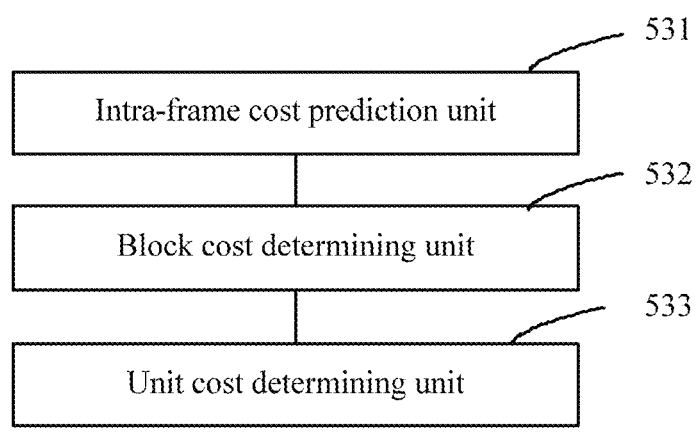
FIG. 6 is a specific structural block diagram of a module of the bit rate allocation apparatus for code units in video coding in FIG. 5.

Referring to FIG. 6, in an embodiment, the cost obtaining module 530 includes:

an intra-frame cost prediction unit 531, configured to: obtain pixel values of code blocks of the uncoded code units obtained after downsampling, and determine intra-frame prediction costs of the code blocks based on a preset optimal intra-frame prediction mode and the pixel values of the code blocks;

a block cost determining unit 532, configured to obtain a frame type of the current frame, and determine, based on the intra-frame prediction costs and the frame type, final block prediction costs corresponding to the code blocks; and a unit cost determining unit 533, configured to determine the unit prediction costs of the uncoded code units, the current code unit prediction costs, and the frame uncoded unit prediction costs based on the final block prediction costs corresponding to the code blocks.

In an embodiment, the intra-frame cost prediction unit 531 includes an intra-frame mode determining subunit, an intra-frame prediction value determining subunit, and an intra-frame block cost determining subunit.

The intra-frame mode determining subunit is configured to select, by using a preset intra-frame selection policy, an intra-frame prediction mode for the code blocks of the uncoded code units obtained after downsampling in the current frame, to determine the optimal intra-frame prediction mode.

The intra-frame prediction value determining subunit is configured to: obtain the pixel values of the code blocks, and determine intra-frame prediction values of the code blocks based on the optimal intra-frame prediction mode corresponding to the code blocks.

The intra-frame block cost prediction subunit is configured to determine intra-frame block prediction costs based on the pixel values and the intra-frame prediction values of the code blocks, the intra-frame block prediction costs being the intra-frame prediction costs of the code blocks.

In an embodiment, the block cost determining unit 532 includes a type obtaining subunit and an intra-frame block cost determining subunit.

The type obtaining subunit is configured to obtain the frame type of the current frame.

The intra-frame block cost determining subunit is configured to: if the frame type is an intra-frame prediction frame, use the intra-frame block prediction costs as the final block prediction costs corresponding to the code blocks.

In an embodiment, the block cost determining unit 532 further includes an inter-frame prediction value determining subunit and an inter-frame block cost determining subunit.

The inter-frame prediction value determining subunit is configured to: if the frame type is an inter-frame prediction frame, determine inter-frame prediction costs of the code blocks based on a preset optimal inter-frame prediction mode and the pixel values of the code blocks.

The inter-frame block cost determining subunit is configured to determine a smaller value between the inter-frame prediction costs and the intra-frame prediction costs of the code blocks as the final block prediction costs of the code blocks.

In an embodiment, the unit cost determining unit 533 includes a first unit cost determining unit and a second unit cost determining unit.

The first unit cost determining unit is configured to determine the unit prediction costs of the uncoded code units based on the final block prediction costs corresponding to the code blocks.

The second unit cost determining unit is configured to: use the unit prediction costs of the current to-be-coded code unit as the current code unit prediction costs, and determine the frame uncoded unit prediction costs based on the unit prediction costs of the uncoded code units in the current frame.

In an embodiment, the code units are basic bit rate control units, and the basic bit rate control units are minimum bit rate control units having consistent quantization parameters.

The bit rate allocation apparatus for code units in video coding may correspond to the bit rate allocation method for code units in video coding. Therefore, for specific technical features of the apparatus that correspond to those in the method, repetitive details are not described herein.

Figure 7:
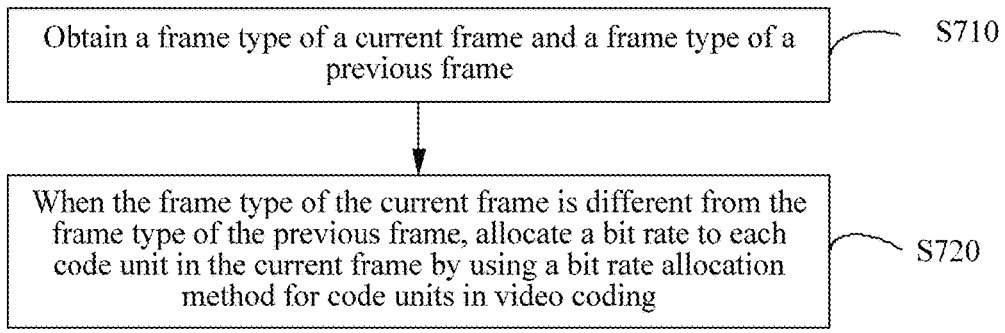
FIG. 7 is a flowchart of a bit rate allocation method for video coding according to an embodiment.

The disclosure further provides a bit rate allocation method for video coding. FIG. 7 shows a bit rate allocation method for video coding according to an embodiment. The method is run in the user terminals or the server 130 shown in FIG. 1, the method including the following operations:

S710: Obtain a frame type of a current frame and a frame type of a previous frame.

The frame type includes an intra-frame prediction frame and an inter-frame prediction frame. For the intra-frame prediction frame, final prediction costs need to be determined by using intra-frame prediction costs. For the inter-frame prediction frame, final prediction costs may be determined by using intra-frame prediction costs or inter-frame prediction costs.

S720: When the frame type of the current frame is different from the frame type of the previous frame, allocate a bit rate to each code unit in the current frame by using the bit rate allocation method for code units in video coding in the foregoing embodiment.

The bit rate allocation method for code units in video coding in the foregoing embodiment includes:

obtaining a target bit rate and a coded bit rate of the current frame, the coded bit rate being determined based on an actual bit rate of each coded code unit in the current frame;

determining a frame uncoded bit rate based on the target bit rate and the coded bit rate of the current frame;

obtaining current code unit prediction costs and frame uncoded unit prediction costs that are determined based on precoding, the current code unit prediction costs being unit prediction costs of a current to-be-coded code unit among uncoded code units in the current frame, and the frame uncoded unit prediction costs being determined based on unit prediction costs of the uncoded code units in the current frame; and determining a target bit rate of the current to-be-coded code unit based on the frame uncoded bit rate and a cost ratio, the cost ratio being a ratio of the current code unit prediction costs to the frame uncoded unit prediction costs.

In an embodiment of the bit rate allocation method for code units in video coding, the step of obtaining the current code unit prediction costs and the frame uncoded unit prediction costs that are determined based on precoding includes:

obtaining pixel values of code blocks of the uncoded code units obtained after downsampling, and determining intra-frame prediction costs of the code blocks based on a preset optimal intra-frame prediction mode and the pixel values of the code blocks;

obtaining the frame type of the current frame, and determining, based on the intra-frame prediction costs and the frame type, final block prediction costs corresponding to the code blocks; and determining the unit prediction costs of the uncoded code units, the current code unit prediction costs, and the frame uncoded unit prediction costs based on the final block prediction costs corresponding to the code blocks.

In an embodiment of the bit rate allocation method for code units in video coding, the step of obtaining pixel values of code blocks of the uncoded code units obtained after downsampling, and determining intra-frame prediction costs of the code blocks based on a preset optimal intra-frame prediction mode and the pixel values of the code blocks includes:

selecting, by using a preset intra-frame selection policy, an intra-frame prediction mode for the code blocks of the uncoded code units obtained after downsampling in the current frame, to determine the optimal intra-frame prediction mode;

obtaining the pixel values of the code blocks, and determining intra-frame prediction values of the code blocks based on the optimal intra-frame prediction mode corresponding to the code blocks; and determining intra-frame block prediction costs based on the pixel values and the intra-frame prediction values of the code blocks, the intra-frame block prediction costs being the intra-frame prediction costs of the code blocks.

In an embodiment of the bit rate allocation method for code units in video coding, the operation of obtaining the frame type of the current frame, and determining, based on the intra-frame prediction costs and the frame type, final block prediction costs corresponding to the code blocks includes:

obtaining the frame type of the current frame; and if the frame type is an intra-frame prediction frame, using the intra-frame block prediction costs as the final block prediction costs corresponding to the code blocks.

In an embodiment of the bit rate allocation method for code units in video coding, the operation of obtaining a frame type of the current frame, and determining, based on the intra-frame prediction costs and the frame type, final block prediction costs corresponding to the code blocks further includes:

if the frame type is an inter-frame prediction frame, determining inter-frame prediction costs of the code blocks based on a preset optimal inter-frame prediction mode and the pixel values of the code blocks; and determining a smaller value between the inter-frame prediction costs and the intra-frame prediction costs of the code blocks as the final block prediction costs of the code blocks.

In an embodiment of the bit rate allocation method for code units in video coding, the operation of determining the unit prediction costs of the uncoded code units, the current code unit prediction costs, and the frame uncoded unit prediction costs based on the final block prediction costs corresponding to the code blocks includes:

determining the unit prediction costs of the uncoded code units based on the final block prediction costs corresponding to the code blocks; and using the unit prediction costs of the current to-be-coded code unit as the current code unit prediction costs, and determining the frame uncoded unit prediction costs based on the unit prediction costs of the uncoded code units in the current frame.

In an embodiment, the code units are basic bit rate control units, and the basic bit rate control units are minimum bit rate control units having consistent quantization parameters.

According to the allocation method for video coding, when the frame type of the current frame is different from the frame type of the previous frame, a bit rate allocation method for code units in video coding that can reduce an error of bit rate allocation of a current to-be-coded code unit and improve video quality is used to allocate a bit rate to each code unit in the current frame, thereby improving the video quality.

Figure 8:
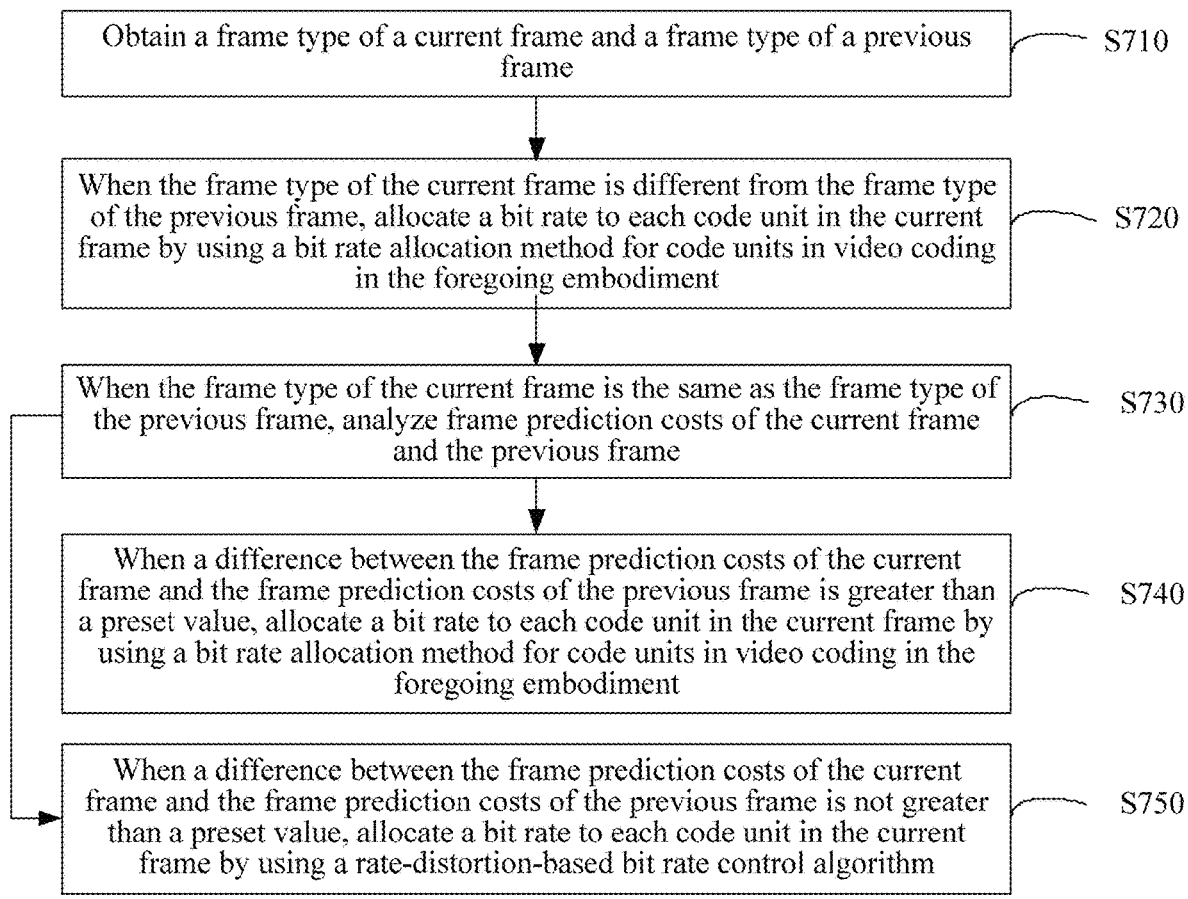
FIG. 8 is a flowchart of a bit rate allocation method for video coding according to another embodiment.

Referring to FIG. 8, in an exemplary embodiment, the bit rate allocation method for video coding may further include S730 and S740.

S730: When the frame type of the current frame is the same as the frame type of the previous frame, analyze frame prediction costs of the current frame and the previous frame.

A manner for analyzing the frame prediction costs of the current frame includes the following operations: obtaining the pixel values of the code blocks of the code units obtained after downsampling in the current frame, and determining the intra-frame prediction costs of the code blocks based on the preset optimal intra-frame prediction mode and the pixel values of the code blocks; and obtaining the frame type of the current frame, determining, based on the intra-frame prediction costs and the frame type, the final block prediction costs corresponding to the code blocks, and further, determining the unit prediction costs of the code units, to determine the frame prediction costs of the current frame. A manner for analyzing the frame prediction costs of the previous frame is similar to that for analyzing the frame prediction costs of the current frame, and repetitive details are not described herein again. It should be understood that unit prediction costs of a code unit may be determined based on a sum of final block prediction costs corresponding to code blocks of the code unit or a sum of weights. The frame prediction costs of the current frame may be determined based on a sum of the unit prediction costs corresponding to the code blocks in the current frame or a sum of weights.

S740: When a difference between the frame prediction costs of the current frame and the frame prediction costs of the previous frame is greater than a preset value, allocate a bit rate to each code unit in the current frame by using the bit rate allocation method for code units in video coding in the foregoing embodiment.

Referring to FIG. 8, in an exemplary embodiment, the bit rate allocation method for video coding may further include S730 and S750.

S730: When the frame type of the current frame is the same as the frame type of the previous frame, analyze frame prediction costs of the current frame and the previous frame.

A manner for analyzing the frame prediction costs of the current frame includes the following operations: obtaining the pixel values of the code blocks of the code units obtained after downsampling in the current frame, and determining the intra-frame prediction costs of the code blocks based on the preset optimal intra-frame prediction mode and the pixel values of the code blocks; and obtaining the frame type of the current frame, determining, based on the intra-frame prediction costs and the frame type, the final block prediction costs corresponding to the code blocks, and further, determining the unit prediction costs of the code units, to determine the frame prediction costs of the current frame. A manner for analyzing the frame prediction costs of the previous frame is similar to that for analyzing the frame prediction costs of the current frame, and repetitive details are not described herein again. It should be understood that unit prediction costs of a code unit may be determined based on a sum of final block prediction costs corresponding to code blocks of the code unit or a sum of weights. The frame prediction costs of the current frame may be determined based on a sum of the unit prediction costs corresponding to the code blocks in the current frame or a sum of weights.

S750: When a difference between the frame prediction costs of the current frame and the frame prediction costs of the previous frame is not greater than a preset value, allocate a bit rate to each code unit in the current frame by using a rate-distortion-based bit rate control algorithm.

In the rate-distortion-based bit rate control algorithm, first, a mean absolute difference (MAD) of all uncoded code units in the current frame is predicted, and then, a bit rate is allocated to each code unit with reference to a MAD of a coded code unit in the current frame.

Referring to FIG. 8, in an exemplary embodiment, the bit rate allocation method for video coding may further include S730, S740, and S750.

S730: When the frame type of the current frame is the same as the frame type of the previous frame, analyze frame prediction costs of the current frame and the previous frame.

A manner for analyzing the frame prediction costs of the current frame includes the following operations: obtaining the pixel values of the code blocks of the code units obtained after downsampling in the current frame, and determining the intra-frame prediction costs of the code blocks based on the preset optimal intra-frame prediction mode and the pixel values of the code blocks; and obtaining the frame type of the current frame, determining, based on the intra-frame prediction costs and the frame type, the final block prediction costs corresponding to the code blocks, and further, determining the unit prediction costs of the code units, to determine the frame prediction costs of the current frame. A manner for analyzing the frame prediction costs of the previous frame is similar to that for analyzing the frame prediction costs of the current frame, and repetitive details are not described herein again. It should be understood that unit prediction costs of a code unit may be determined based on a sum of final block prediction costs corresponding to code blocks of the code unit or a sum of weights. The frame prediction costs of the current frame may be determined based on a sum of the unit prediction costs corresponding to the code blocks in the current frame or a sum of weights.

S740: When a difference between the frame prediction costs of the current frame and the frame prediction costs of the previous frame is greater than a preset value, allocate a bit rate to each code unit in the current frame by using the bit rate allocation method for code units in video coding in the foregoing embodiment.

S750: When a difference between the frame prediction costs of the current frame and the frame prediction costs of the previous frame is not greater than a preset value, allocate a bit rate to each code unit in the current frame by using a rate-distortion-based bit rate control algorithm.

In the rate-distortion-based bit rate control algorithm, first, a mean absolute difference (MAD) of all uncoded code units in the current frame is predicted, and then, a bit rate is allocated to each code unit with reference to a MAD of a coded code unit in the current frame.

Figure 9:
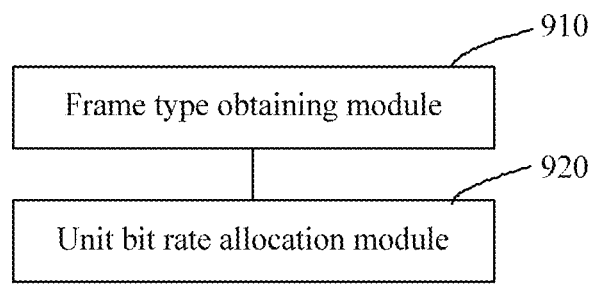
FIG. 9 is a structural block diagram of a bit rate allocation apparatus for video coding according to an embodiment.

The disclosure further provides a bit rate allocation apparatus for video coding. The apparatus is disposed in a computer device. Various modules in the apparatus may be run by the computer device. Referring to FIG. 9, a bit rate allocation apparatus for video coding in an embodiment includes:

a frame type obtaining module 910, configured to obtain a frame type of a current frame and a frame type of a previous frame; and a unit bit rate allocation module 920, configured to: when the frame type of the current frame is different from the frame type of the previous frame, allocate a bit rate to each code unit in the current frame by using the foregoing bit rate allocation apparatus for code units in video coding.

According to the allocation apparatus for video coding, when the frame type of the current frame is different from the frame type of the previous frame, the bit rate allocation method for code units in video coding that can reduce an error of bit rate allocation of a current to-be-coded code unit and improve video quality is used to allocate a bit rate to each code unit in the current frame, thereby improving the video quality.

Figure 10:
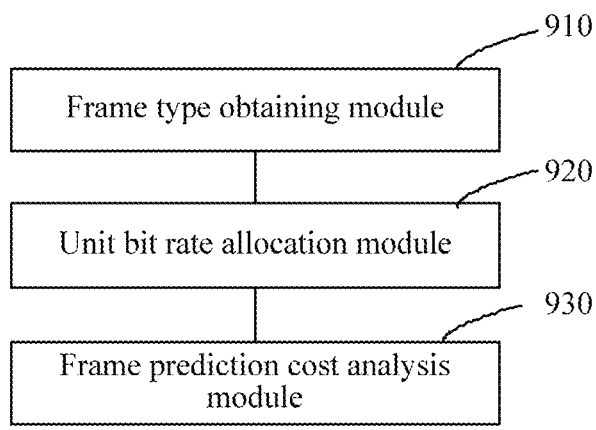
FIG. 10 is a structural block diagram of a bit rate allocation apparatus for video coding according to another embodiment.

Referring to FIG. 10, in an embodiment, the bit rate allocation apparatus further includes a frame prediction cost analysis module 930.

The frame prediction cost analysis module 930 is configured to: when the frame type of the current frame is the same as the frame type of the previous frame, analyze frame prediction costs of the current frame and the previous frame.

In this case, the unit bit rate allocation module 920 is further configured to: when a difference between the frame prediction costs of the current frame and the frame prediction costs of the previous frame is greater than a preset value, allocate a bit rate to each code unit in the current frame by using the foregoing bit rate allocation apparatus for code units in video coding.

In addition, the unit bit rate allocation module 920 is further configured to: when a difference between the frame prediction costs of the current frame and the frame prediction costs of the previous frame is not greater than the preset value, allocate a bit rate to each code unit in the current frame by using a rate-distortion-based bit rate control algorithm.

The bit rate allocation apparatus for video coding corresponds to the bit rate allocation method for video coding. Therefore, for specific technical features in the apparatus that correspond to those in the method, repetitive details are not described herein again.

An embodiment further provides a computer device, including a memory and a processor, the memory storing computer-readable instructions, and when executed by the processor, the computer-readable instructions causing the processor to perform the following operations:

obtaining a target bit rate and a coded bit rate of a current frame, the coded bit rate being determined based on an actual bit rate of each coded code unit in the current frame;

determining a frame uncoded bit rate based on the target bit rate and the coded bit rate of the current frame;

obtaining current code unit prediction costs and frame uncoded unit prediction costs that are determined based on precoding, the current code unit prediction costs being unit prediction costs of a current to-be-coded code unit among uncoded code units in the current frame, and the frame uncoded unit prediction costs being determined based on unit prediction costs of the uncoded code units in the current frame; and determining a target bit rate of the current to-be-coded code unit based on the frame uncoded bit rate and a cost ratio, the cost ratio being a ratio of the current code unit prediction costs to the frame uncoded unit prediction costs.

In an embodiment, the operation of obtaining current code unit prediction costs and frame uncoded unit prediction costs that are determined based on precoding includes:

obtaining pixel values of code blocks of the uncoded code units obtained after downsampling, and determining intra-frame prediction costs of the code blocks based on a preset optimal intra-frame prediction mode and the pixel values of the code blocks;

obtaining a frame type of the current frame, and determining, based on the intra-frame prediction costs and the frame type, final block prediction costs corresponding to the code blocks; and determining the unit prediction costs of the uncoded code units, the current code unit prediction costs, and the frame uncoded unit prediction costs based on the final block prediction costs corresponding to the code blocks.

In an embodiment, the operation of obtaining pixel values of code blocks of the uncoded code units obtained after downsampling, and determining intra-frame prediction costs of the code blocks based on a preset optimal intra-frame prediction mode and the pixel values of the code blocks includes:

selecting, by using a preset intra-frame selection policy, an intra-frame prediction mode for the code blocks of the uncoded code units obtained after downsampling in the current frame, to determine the optimal intra-frame prediction mode;

obtaining the pixel values of the code blocks, and determining intra-frame prediction values of the code blocks based on the optimal intra-frame prediction mode corresponding to the code blocks; and determining intra-frame block prediction costs based on the pixel values and the intra-frame prediction values of the code blocks, the intra-frame block prediction costs being the intra-frame prediction costs of the code blocks.

In an embodiment, the operation of obtaining a frame type of the current frame, and determining, based on the intra-frame prediction costs and the frame type, final block prediction costs corresponding to the code blocks includes:

obtaining the frame type of the current frame; and if the frame type is an intra-frame prediction frame, using the intra-frame block prediction costs as the final block prediction costs corresponding to the code blocks.

In an embodiment, the operation of obtaining a frame type of the current frame, and determining, based on the intra-frame prediction costs and the frame type, final block prediction costs corresponding to the code blocks further includes:

if the frame type is an inter-frame prediction frame, determining inter-frame prediction costs of the code blocks based on a preset optimal inter-frame prediction mode and the pixel values of the code blocks; and determining a smaller value between the inter-frame prediction costs and the intra-frame prediction costs of the code blocks as the final block prediction costs of the code blocks.

In an embodiment, the operation of determining the unit prediction costs of the uncoded code units, the current code unit prediction costs, and the frame uncoded unit prediction costs based on the final block prediction costs corresponding to the code blocks includes:

determining the unit prediction costs of the uncoded code units based on the final block prediction costs corresponding to the code blocks; and using the unit prediction costs of the current to-be-coded code unit as the current code unit prediction costs, and determining the frame uncoded unit prediction costs based on the unit prediction costs of the uncoded code units in the current frame.

In an embodiment, the code units are basic bit rate control units, and the basic bit rate control units are minimum bit rate control units having consistent quantization parameters.

An embodiment further provides a computer device, including a memory and a processor, the memory storing computer-readable instructions, and when executed by the processor, the computer-readable instructions causing the processor to perform the following operations:

obtaining a frame type of a current frame and a frame type of a previous frame; and when the frame type of the current frame is different from the frame type of the previous frame, allocating a bit rate to each code unit in the current frame by using the foregoing bit rate allocation method for code units in video coding.

In an embodiment, the following operations are further included:

when the frame type of the current frame is the same as the frame type of the previous frame, analyzing frame prediction costs of the current frame and the previous frame; and when a difference between the frame prediction costs of the current frame and the frame prediction costs of the previous frame is greater than a preset value, allocating a bit rate to each code unit in the current frame by using the foregoing bit rate allocation method for code units in video coding; and/or when a difference between the frame prediction costs of the current frame and the frame prediction costs of the previous frame is not greater than a preset value, allocating a bit rate to each code unit in the current frame by using a rate-distortion-based bit rate control algorithm.

An embodiment further provides one or more non-volatile storage media storing computer-readable instructions, when executed by one or more processors, the computer-readable instructions causing the one or more processors to perform the following operations:

obtaining a target bit rate and a coded bit rate of a current frame, the coded bit rate being determined based on an actual bit rate of each coded code unit in the current frame;

determining a frame uncoded bit rate based on the target bit rate and the coded bit rate of the current frame;

obtaining current code unit prediction costs and frame uncoded unit prediction costs that are determined based on precoding, the current code unit prediction costs being unit prediction costs of a current to-be-coded code unit among uncoded code units in the current frame, and the frame uncoded unit prediction costs being determined based on unit prediction costs of the uncoded code units in the current frame; and determining a target bit rate of the current to-be-coded code unit based on the frame uncoded bit rate and a cost ratio, the cost ratio being a ratio of the current code unit prediction costs to the frame uncoded unit prediction costs.

In an embodiment, the operation of obtaining current code unit prediction costs and frame uncoded unit prediction costs that are determined based on precoding includes:

obtaining pixel values of code blocks of the uncoded code units obtained after downsampling, and determining intra-frame prediction costs of the code blocks based on a preset optimal intra-frame prediction mode and the pixel values of the code blocks;

obtaining a frame type of the current frame, and determining, based on the intra-frame prediction costs and the frame type, final block prediction costs corresponding to the code blocks; and determining the unit prediction costs of the uncoded code units, the current code unit prediction costs, and the frame uncoded unit prediction costs based on the final block prediction costs corresponding to the code blocks.

In an embodiment, the operation of obtaining pixel values of code blocks of the uncoded code units obtained after downsampling, and determining intra-frame prediction costs of the code blocks based on a preset optimal intra-frame prediction mode and the pixel values of the code blocks includes:

selecting, by using a preset intra-frame selection policy, an intra-frame prediction mode for the code blocks of the uncoded code units obtained after downsampling in the current frame, to determine the optimal intra-frame prediction mode;

obtaining the pixel values of the code blocks, and determining intra-frame prediction values of the code blocks based on the optimal intra-frame prediction mode corresponding to the code blocks; and determining intra-frame block prediction costs based on the pixel values and the intra-frame prediction values of the code blocks, the intra-frame block prediction costs being the intra-frame prediction costs of the code blocks.

In an embodiment, the operation of obtaining a frame type of the current frame, and determining, based on the intra-frame prediction costs and the frame type, final block prediction costs corresponding to the code blocks includes:

obtaining the frame type of the current frame; and if the frame type is an intra-frame prediction frame, using the intra-frame block prediction costs as the final block prediction costs corresponding to the code blocks.

In an embodiment, the operation of obtaining a frame type of the current frame, and determining, based on the intra-frame prediction costs and the frame type, final block prediction costs corresponding to the code blocks further includes:

if the frame type is an inter-frame prediction frame, determining inter-frame prediction costs of the code blocks based on a preset optimal inter-frame prediction mode and the pixel values of the code blocks; and determining a smaller value between the inter-frame prediction costs and the intra-frame prediction costs of the code blocks as the final block prediction costs of the code blocks.

In an embodiment, the operation of determining the unit prediction costs of the uncoded code units, the current code unit prediction costs, and the frame uncoded unit prediction costs based on the final block prediction costs corresponding to the code blocks includes:

determining the unit prediction costs of the uncoded code units based on the final block prediction costs corresponding to the code blocks; and using the unit prediction costs of the current to-be-coded code unit as the current code unit prediction costs, and determining the frame uncoded unit prediction costs based on the unit prediction costs of the uncoded code units in the current frame.

In an embodiment, the code units are basic bit rate control units, and the basic bit rate control units are minimum bit rate control units having consistent quantization parameters.

An embodiment provides one or more non-volatile storage media storing computer-readable instructions, when executed by one or more processors, the computer-readable instructions causing the one or more processors to perform the following operations:

obtaining a frame type of a current frame and a frame type of a previous frame; and when the frame type of the current frame is different from the frame type of the previous frame, allocating a bit rate to each code unit in the current frame by using the foregoing bit rate allocation method for code units in video coding.

In an embodiment, the following operations are further included:

when the frame type of the current frame is the same as the frame type of the previous frame, analyzing frame prediction costs of the current frame and the previous frame; and when a difference between the frame prediction costs of the current frame and the frame prediction costs of the previous frame is greater than a preset value, allocating a bit rate to each code unit in the current frame by using the bit rate allocation method for code units in video coding; and/or when a difference between the frame prediction costs of the current frame and the frame prediction costs of the previous frame is not greater than a preset value, allocating a bit rate to each code unit in the current frame by using a rate-distortion-based bit rate control algorithm.

A person of ordinary skill in the art may understand that all or some procedures in the methods in the foregoing embodiments may be implemented by using a computer program instructing related hardware. The program may be stored in a non-volatile computer readable storage medium. When the program is executed, procedures of the embodiments of the foregoing methods may be included. Any reference for a memory, storage, a database, or other media provided in the disclosure and used in the embodiments may include a non-volatile memory and/or a volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. As a description instead of a limitation, the RAM may have multiple forms, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a rambus direct RAM (RDRAM), a direct rambus dynamic RAM (DRDRAM), and a rambus dynamic RAM (RDRAM).

Technical features of the foregoing embodiments may be combined. For brevity of description, not all possible combinations of the technical features of the foregoing embodiments are described. However, the technical features shall fall within the scope of this specification provided that the technical features do not have any conflict.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments are merely intended for describing the technical solutions, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A bit rate allocation method for code units in video coding, applied to a user terminal or a server, and comprising:

obtaining a target bit rate and a coded bit rate of a current frame, the coded bit rate being determined based on an actual bit rate of each coded code unit in the current frame;

determining a frame uncoded bit rate based on the target bit rate and the coded bit rate of the current frame;

obtaining current code unit prediction costs and frame uncoded unit prediction costs that are determined based on precoding, the current code unit prediction costs being unit prediction costs of a current to-be-coded code unit among uncoded code units in the current frame, and the frame uncoded unit prediction costs being determined based on unit prediction costs of the uncoded code units in the current frame; and determining a target bit rate of the current to-be-coded code unit based on the frame uncoded bit rate and a cost ratio, the cost ratio being a ratio of the current code unit prediction costs to the frame uncoded unit prediction costs.

2. The bit rate allocation method for code units in video coding according to claim 1, wherein the obtaining the current code unit prediction costs and the frame uncoded unit prediction costs comprises:

obtaining pixel values of code blocks of the uncoded code units obtained after downsampling, and determining intra-frame prediction costs of the code blocks based on a optimal intra-frame prediction mode and the pixel values of the code blocks;

obtaining a frame type of the current frame, and determining, based on the intra-frame prediction costs and the frame type, final block prediction costs corresponding to the code blocks; and determining the unit prediction costs of the uncoded code units, the current code unit prediction costs, and the frame uncoded unit prediction costs based on the final block prediction costs corresponding to the code blocks.

3. The bit rate allocation method for code units in video coding according to claim 2, wherein the obtaining the pixel values of code blocks, and the determining the intra-frame prediction costs of the code blocks comprises:

selecting, by using a preset intra-frame selection policy, an intra-frame prediction mode for the code blocks, to determine the optimal intra-frame prediction mode;

obtaining the pixel values of the code blocks, and determining intra-frame prediction values of the code blocks based on the optimal intra-frame prediction mode corresponding to the code blocks; and determining intra-frame block prediction costs based on the pixel values and the intra-frame prediction values of the code blocks, the intra-frame block prediction costs being the intra-frame prediction costs of the code blocks.

4. The bit rate allocation method for code units in video coding according to claim 2, wherein the determining the final block prediction costs comprises:

in response to the frame type being an intra-frame prediction frame, determining, based on the intra-frame block prediction costs, the final block prediction costs corresponding to the code blocks.

5. The bit rate allocation method for code units in video coding according to claim 4, wherein the determining the final block prediction costs further comprises:

in response to the frame type being an inter-frame prediction frame, determining inter-frame prediction costs of the code blocks based on a preset optimal inter-frame prediction mode and the pixel values of the code blocks; and determining a smaller value between the inter-frame prediction costs and the intra-frame prediction costs of the code blocks as the final block prediction costs of the code blocks.

6. The bit rate allocation method for code units in video coding according to claim 2, wherein the determining the unit prediction costs of the uncoded code units, the current code unit prediction costs, and the frame uncoded unit prediction costs comprises:

determining the unit prediction costs of the uncoded code units based on the final block prediction costs corresponding to the code blocks; and determining the current code unit prediction costs based on the unit prediction costs of the current to-be-coded code unit, and determining the frame uncoded unit prediction costs based on the unit prediction costs of the uncoded code units in the current frame.

7. The bit rate allocation method for code units in video coding according to claim 1, wherein the code units are basic bit rate control units, and the basic bit rate control units are minimum bit rate control units having consistent quantization parameters.

8. The bit rate allocation method for code units in video coding according to claim 1, wherein the method is performed to allocate a bit rate to each code unit in the current frame, in response to a frame type of the current frame being different from a frame type of a previous frame.

9. A bit rate allocation apparatus for code units in video coding comprising:

at least one memory operable to store program code; and at least one processor operable to access said at least one memory, read said program code, and operate according to said program code, said program code comprising:

first obtaining code configured to cause the at least one processor to obtain a target bit rate and a coded bit rate of a current frame, the coded bit rate being determined based on an actual bit rate of each coded code unit in the current frame;

first determining code configured to cause the at least one processor to determine a frame uncoded bit rate based on the target bit rate and the coded bit rate of the current frame;

second obtaining code configured to cause the at least one processor to obtain current code unit prediction costs and frame uncoded unit prediction costs that are determined based on precoding, the current code unit prediction costs being unit prediction costs of a current to-be-coded code unit among uncoded code units in the current frame, and the frame uncoded unit prediction costs being determined based on unit prediction costs of the uncoded code units in the current frame; and second determining code configured to cause the at least one processor to determine a target bit rate of the current to-be-coded code unit based on the frame uncoded bit rate and a cost ratio, the cost ratio being a ratio of the current code unit prediction costs to the frame uncoded unit prediction costs.

10. The bit rate allocation apparatus for code units in video coding according to claim 9, wherein the second obtaining code comprises:

third obtaining sub-code configured to cause the at least one processor to obtain pixel values of code blocks of the uncoded code units obtained after downsampling, and determining intra-frame prediction costs of the code blocks based on a optimal intra-frame prediction mode and the pixel values of the code blocks;

fourth obtaining sub-code configured to cause the at least one processor to obtain a frame type of the current frame, and determine, based on the intra-frame prediction costs and the frame type, final block prediction costs corresponding to the code blocks; and first determining sub-code configured to cause the at least one processor to determine the unit prediction costs of the uncoded code units, the current code unit prediction costs, and the frame uncoded unit prediction costs based on the final block prediction costs corresponding to the code blocks.

11. The bit rate allocation apparatus for code units in video coding according to claim 10, wherein the third obtaining sub-code causes comprises:
Selecting sub-code configured to cause the at least one processor to select, by using a preset intra-frame selection policy, an intra-frame prediction mode for the code blocks, to determine the optimal intra-frame prediction mode;
fifth obtaining sub-code configured to cause the at least one processor to obtain the pixel values of the code blocks, and determine intra-frame prediction values of the code blocks based on the optimal intra-frame prediction mode corresponding to the code blocks; and
second determining sub-code configured to cause the at least one processor to determine intra-frame block prediction costs based on the pixel values and the intra-frame prediction values of the code blocks, the intra-frame block prediction costs being the intra-frame prediction costs of the code blocks.

12. The bit rate allocation apparatus for code units in video coding according to claim 10, wherein the fourth obtaining sub-code causes the at least one processor to:
in response to the frame type being an intra-frame prediction frame, determine, based on the intra-frame block prediction costs, the final block prediction costs corresponding to the code blocks.

13. The bit rate allocation apparatus for code units in video coding according to claim 12, wherein the fourth obtaining sub-code further causes the at least one processor to:
in response to the frame type being an inter-frame prediction frame, determine inter-frame prediction costs of the code blocks based on a preset optimal inter-frame prediction mode and the pixel values of the code blocks; and
determine a smaller value between the inter-frame prediction costs and the intra-frame prediction costs of the code blocks as the final block prediction costs of the code blocks.

14. The bit rate allocation apparatus for code units in video coding according to claim 10, wherein the first determining sub-code causes the at least one processor to:
determine the unit prediction costs of the uncoded code units based on the final block prediction costs corresponding to the code blocks; and
determine the current code unit prediction costs based on the unit prediction costs of the current to-be-coded code unit, and determine the frame uncoded unit prediction costs based on the unit prediction costs of the uncoded code units in the current frame.

15. The bit rate allocation apparatus for code units in video coding according to claim 9, wherein the code units are basic bit rate control units, and the basic bit rate control units are minimum bit rate control units having consistent quantization parameters.

16. The bit rate allocation apparatus for code units in video coding according to claim 9, wherein the at least one processor operates according to said program code to allocate a bit rate to each code unit in the current frame, in response to a frame type of the current frame being different from a frame type of a previous frame.

17. A non-transitory computer readable storage medium storing instructions, which, when executed by one or more processors, cause the one or more processors to perform:
obtaining a target bit rate and a coded bit rate of a current frame, the coded bit rate being determined based on an actual bit rate of each coded code unit in the current frame;
determining a frame uncoded bit rate based on the target bit rate and the coded bit rate of the current frame;
obtaining current code unit prediction costs and frame uncoded unit prediction costs that are determined based on precoding, the current code unit prediction costs being unit prediction costs of a current to-be-coded code unit among uncoded code units in the current frame, and the frame uncoded unit prediction costs being determined based on unit prediction costs of the uncoded code units in the current frame; and
determining a target bit rate of the current to-be-coded code unit based on the frame uncoded bit rate and a cost ratio, the cost ratio being a ratio of the current code unit prediction costs to the frame uncoded unit prediction costs.

18. The computer readable storage medium according to claim 17, wherein the obtaining the current code unit prediction costs and the frame uncoded unit prediction costs comprises:
obtaining pixel values of code blocks of the uncoded code units obtained after downsampling, and determining intra-frame prediction costs of the code blocks based on a preset optimal intra-frame prediction mode and the pixel values of the code blocks;
obtaining a frame type of the current frame, and determining, based on the intra-frame prediction costs and the frame type, final block prediction costs corresponding to the code blocks; and
determining the unit prediction costs of the uncoded code units, the current code unit prediction costs, and the frame uncoded unit prediction costs based on the final block prediction costs corresponding to the code blocks.

19. The computer readable storage medium according to claim 18, wherein the obtaining the pixel values of code blocks, and the determining the intra-frame prediction costs of the code blocks comprises:
selecting, by using a preset intra-frame selection policy, an intra-frame prediction mode for the code blocks, to determine the optimal intra-frame prediction mode;
obtaining the pixel values of the code blocks, and determining intra-frame prediction values of the code blocks based on the optimal intra-frame prediction mode corresponding to the code blocks; and
determining intra-frame block prediction costs based on the pixel values and the intra-frame prediction values of the code blocks, the intra-frame block prediction costs being the intra-frame prediction costs of the code blocks.

20. The computer readable storage medium according to claim 18, wherein the determining the final block prediction costs comprises:
in response to the frame type being an intra-frame prediction frame, determining, based on the intra-frame block prediction costs, the final block prediction costs corresponding to the code blocks.

* * * * *